United States Patent
Nakamura et al.

[11] Patent Number: 6,042,196
[45] Date of Patent: Mar. 28, 2000

[54] TRAILER BRAKE CONTROL DEVICE OF TRACTOR-TRAILER COMBINATION VEHICLE FOR SUPPRESSION OF SIDE SWAY OF TRAILER

[75] Inventors: Katsushi Nakamura, Susono; Masaru Sakai, Shizuoka-ken, both of Japan

[73] Assignee: Toyota Jidosha Kabushiki Kaisha, Toyota, Japan

[21] Appl. No.: 09/012,819

[22] Filed: Jan. 23, 1998

[30] Foreign Application Priority Data

Feb. 25, 1997 [JP] Japan ........................... 9-56852

[51] Int. Cl.[7] .................................................. B60T 13/00
[52] U.S. Cl. ................................................ 303/7; 188/112 R
[58] Field of Search ........................... 303/7; 188/112 A, 188/112 R; 701/70

[56] References Cited

U.S. PATENT DOCUMENTS

| | | | |
|---|---|---|---|
| 3,948,544 | 4/1976 | Presley et al. | 280/446 B |
| 5,001,639 | 3/1991 | Breen | 303/7 |
| 5,033,798 | 7/1991 | Breen | 188/112 A |
| 5,102,202 | 4/1992 | Breen | 303/7 |
| 5,108,158 | 4/1992 | Breen | 303/7 |

FOREIGN PATENT DOCUMENTS

| | | |
|---|---|---|
| 51-108419 | 9/1976 | Japan . |
| 4-173456 | 6/1992 | Japan . |

*Primary Examiner*—Matthew C. Graham
*Assistant Examiner*—Mariano Sy
*Attorney, Agent, or Firm*—Oliff & Berridge, PLC

[57] ABSTRACT

In a tractor-trailer combination vehicle, a trailer brake control device has a detector of hitch angle expanded by the longitudinal axis of the trailer relative to the longitudinal axis of the tractor around a vertical pivot axis of a joint between the tractor and the trailer, and a controller for selectively actuating brakes of the trailer, wherein the controller controls the actuation of the trailer brakes based upon at least two operational conditions such that the controller starts the actuation of the trailer brakes when the hitch angle increases beyond a threshold value determined therefor and ends the actuation of the trailer brakes when a duration determined for the actuation of the trailer brakes lapses.

15 Claims, 11 Drawing Sheets

TRAILER BRAKE CONTROL DEVICE OF TRACTOR-TRAILER COMBINATION VEHICLE FOR SUPPRESSION OF SIDE SWAY OF TRAILER

BACKGROUND OF THE INVENTION

1. Field of the Invention

The present invention is related to a tractor-trailer combination vehicle, and more particularly, to a device for controlling the brake of the trailer for the purpose of suppressing side sway of the trailer.

2. Description of the Prior Art

In a tractor-trailer combination vehicle in which a trailer is connected with a tractor by a pivotable joint which allows the trailer to sway around the vertical pivot axis of the joint relative to the tractor, it often occurs that, when the combination vehicle receives a side wind during a running or the driver turns the steering wheel at a high rate, the combination vehicle makes an oscillatory side swaying by alternately changing the angle between the longitudinal axes of the tractor and the trailer, the angle being generally called "hitch angle". Such a side sway of the trailer is of course not desirable, as it could induce the so-called jack knife of the combination vehicle when it exasperates.

As a joint for the tractor and the trailer equipped with a means for controlling the side sway of the trailer, there has been proposed by Japanese Patent Laid-open Publication 51-108419 a joint which, when the tractor is braked with a substantial lateral biasing of the trailer relative thereto, actuates the brake of the trailer by utilizing a compression force acting therethrough due to the inertia of the trailer, so as to apply an unbalanced braking force to the opposite side wheels of the trailer, thereby generating a turning moment in the trailer which acts to suppress a side sway of the trailer relative to the tractor.

When the trailer is connected with the tractor by such a joint, an anti-sway moment will be automatically generated in the trailer when it sways relative to the tractor, provided that a compression force is applied through the joint by the tractor being braked while the trailer would outrun the tractor due to its inertia.

However, in the above-mentioned prior art joint, no anti-sway moment is generated in the trailer when there are no compression forces through the joint. Therefore, such a prior art joint is not effectively usable in a tractor-trailer combination vehicle in which the normal braking action is applied to both the tractor and the trailer.

SUMMARY OF THE INVENTION

In view of the above-mentioned problems and the limitations of the prior art, it is a primary object of the present invention to provide a brake control device for a tractor-trailer combination vehicle which can automatically actuate a brake system of the combination vehicle so as to suppress a side sway of the trailer.

According to the present invention, the above-mentioned primary object is accomplished, in a tractor-trailer combination vehicle including a tractor, a trailer and a joint having a vertical pivot axis and connecting the trailer with the tractor, the tractor and the trailer each having a longitudinal axis, wheels and brake means for braking the wheels, by a trailer brake control device comprising a means for detecting hitch angle expanded by the longitudinal axis of the trailer relative to the longitudinal axis of the tractor around the vertical pivot axis of the joint, and a control means for selectively actuating the brake means of the trailer, wherein the control means controls the actuation of the trailer brake means based upon at least two operational conditions such that the control means starts the actuation of the trailer brake means when the hitch angle increases beyond a threshold value determined therefor and ends the actuation of the trailer brake means when a duration determined for the actuation of the trailer brake means lapses.

As described in detail hereinbelow, the braking force generated at the wheels of the trailer applies a turning moment to the trailer to turn it around the vertical pivot axis of the joint relative to the tractor in the magnitude proportional to the side deviation of the trailer relative to the tractor, so that, even when the strength of the brake force is kept constant, the turning moment automatically decreases along with decrease of the side sway of the trailer relative to the tractor. Therefore, when the control means controls the actuation of the trailer brake means based upon at least two operational conditions such that it starts the actuation of the trailer brake means when the hitch angle increases beyond a threshold value determined therefor and ends the actuation of the trailer brake means when a duration determined for the actuation of the trailer brake means lapses, the side sway of the trailer can be effectively suppressed to smoothly fade out in a shortest period by an appropriate determination of the duration of the actuation of the trailer brake means.

In the trailer brake control device of the above-mentioned construction, the control means may actuate the trailer brake means with a predetermined constant target value for the strength of braking force generated thereby.

However, in the trailer brake control device of the above-mentioned construction, if the control means actuates the trailer brake means with a variable target value for the strength of braking force generated thereby, by varying the target value based upon a maximum value of the hitch angle in an oscillatory change thereof, a more desirable side sway suppress control of the trailer will be accomplished.

In such a trailer brake control device, the control means may generally increase the target value according to increase of the maximum value of the hitch angle in the oscillatory change thereof.

The trailer brake control device of the above basic construction may be so constructed that it further comprises a means for detecting vehicle speed, and the control means generally decreases the threshold value of the hitch angle for the actuation of the trailer brake means according to increase of the vehicle speed detected by the vehicle speed detection means.

The trailer brake control device of the above basic construction may be so constructed that it further comprises a means for detecting vehicle speed, and the control means controls the trailer brake means to be actuated only when the vehicle speed detected by the vehicle speed detection means is not smaller than a threshold value determined therefor.

The trailer brake control device of the above basic construction may be so constructed that it further comprises a means for detecting steering angle of the tractor, and the control means controls the trailer brake means to be actuated only when the steering angle detected by the steering angle detection means is not smaller than a threshold value determined therefor.

The trailer brake control device of such a construction may be so constructed that it further comprises a means for detecting vehicle speed, and the control means generally decreases the threshold value of the steering angle for the actuation of the trailer brake means according to increase of the vehicle speed detected by the vehicle speed detection means.

The trailer brake control device of the above basic construction may be so constructed that it further comprises a means for detecting steering angle of the tractor, and the control means comprises a means for calculating differential of the steering angle detected by the steering angle detection means, and controls the trailer brake means to be actuated only when the differential of the steering angle calculated by the differential calculation means is not smaller than a threshold value determined therefor.

The trailer brake control device of the above basic construction may be so constructed that the control means comprises a means for calculating differential of the hitch angle detected by the hitch angle detection means, and controls the trailer brake means with a variable target value for the duration of actuation of the trailer brake means, by varying the target value based upon the absolute value of the differential of the hitch angle in an oscillatory change thereof.

The trailer brake control device of such a construction may be so constructed that the control means generally increases the target value for the duration of actuation of the trailer brake means according to increase of the absolute value of the differential of the hitch angle in the oscillatory change thereof.

The trailer brake control device of the above basic construction may be so constructed that the control means comprises a means for calculating differential of the hitch angle detected by the hitch angle detection means, and actuates the trailer brake means with a variable target value for the strength of braking force generated thereby, by varying the target value based upon the absolute value of the differential of the hitch angle in an oscillatory change thereof.

The trailer brake control device of such a construction may be so constructed that the control means generally increases the target value for the strength of braking force according to increase of the absolute value of the differential of the hitch angle in the oscillatory change thereof.

The trailer brake control device of the above basic construction may be so constructed that the control means controls the trailer brake means with a variable target value for the duration of actuation of the trailer brake means, by varying the target value based upon a maximum value of the hitch angle in an oscillatory change thereof.

The trailer brake control device of such a construction may be so constructed that the control means generally increases the target value for the duration of actuation of the trailer brake means according to increase of the maximum value of the hitch angle in the oscillatory change thereof.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1A:
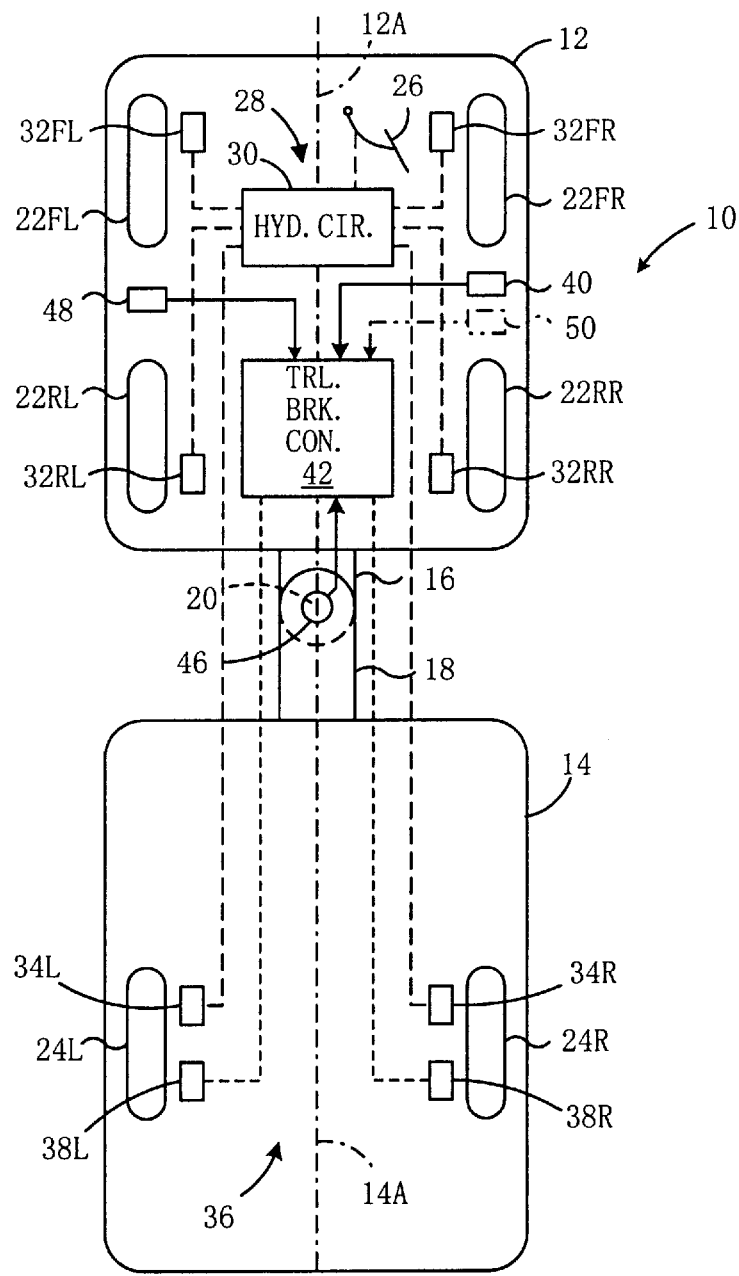
FIG. 1A is a diagrammatical plan view of a tractor-trailer combination vehicle with an embodiment of the trailer brake control device incorporated therein according to the present invention.

Referring to FIG. 1A showing a general construction of a tractor-trailer combination vehicle in which the embodiments of the trailer brake control device according to the present invention are incorporated, the combination vehicle generally designated by 10 includes a tractor 12 and a trailer 14. The tractor 12 and the trailer 14 are connected with one another via a connection means composed of a bracket 16 mounted to the tractor, a bracket 18 mounted to the trailer and a joint 20 connecting the brackets 16 and 18 to be pivotable around a vertical pivot axis positioned at the center thereof. The center of the joint 20 is positioned on a straight line defined by a longitudinal axis 12A of the tractor 12 and a longitudinal axis 14A of the trailer 14 when they are aligned in a straight line.

The tractor 12 has front left and front right wheels 22FL and 22FR and rear left and rear right wheels 22RL and 22RR, while the trailer 14 has left and right wheels 24L and 24R, all of which are adapted to be selectively braked by a service brake system generally designated by 28 when the driver depresses a brake pedal 26. As well known in the art, the service brake system includes an oil hydraulic circuit 30 diagrammatically illustrated by a box and wheel cylinders 32FL, 32FR, 32RL, 32RR, 34L and 34R of the tractor and the trailer, provided at the respective wheels thereof.

Electromagnetic brake means 38L and 38R are further provided at the left and right wheels 34L and 34R of the trailer 14, to be operated independently of the service brake system 28 under a control of trailer brake control 42 when a trailer brake switch (TBSW) 40 is made "on" by the driver. It will be noted that the electromagnetic brake means 38L and 38R for the trailer may be replaced by any other appropriate type of brake means.

Figure 1B:
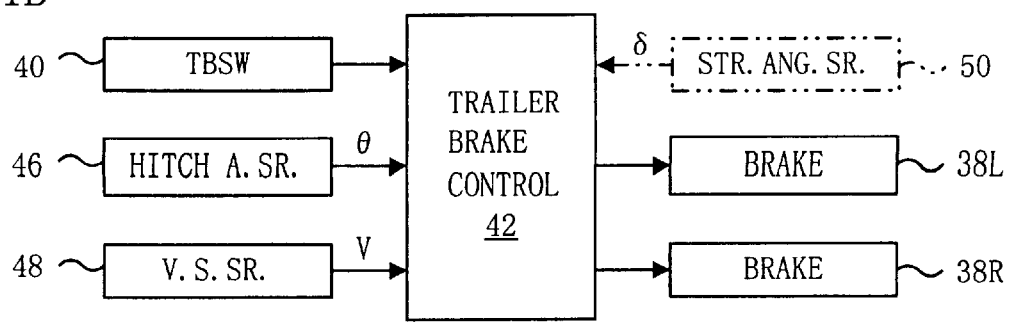
FIG. 1B is a block diagram of the trailer brake control device shown in FIG. 1A.

As shown in FIG. 1B, the trailer brake control 42 is supplied with such signals as a signal instructing the operation thereof from the trailer brake switch 40, a signal representing hitch angle $\theta$ from a hitch angle sensor 46 incorporated in the joint 20, and a signal representing vehicle speed V from a vehicle speed sensor 48, and further, a signal representing steering angle $\delta$ from a steering angle sensor 50 as described with respect to some modified embodiments of the present invention. The signals representing the hitch angle and the steering angle are expressed to be positive when the combination vehicle is making a left turn. Although not shown in detail in FIG. 1B, the trailer brake control 42 is made of a micro-computer and a drive circuit each having an already known construction, wherein the micro-computer may comprise conventional means such as CPU, ROM, RAM, input and output port means, and a bilateral common bus interconnecting these constructional elements.

The trailer brake control 42 operates in such a manner that, when the hitch angle $\theta$ detected by the hitch angle sensor 46 increases beyond a threshold value determined therefor, actuates the brake means 38L and 38R so as to brake the left and right wheels 24L and 24R of the trailer 14 for a duration determined therefor, thereby suppressing an oscillatory side sway of the trailer relative to the tractor.

In the following, the operation of the trailer brake control according to the present invention will be described in more detail with respect to a first embodiment with reference to the flowchart shown in FIG. 2. The control routine according to such a flowchart is started upon a closure of an ignition switch not shown in the figure and executed repetitively at a predetermined cycle time as long as the ignition switch is kept closed.

Figure 3:
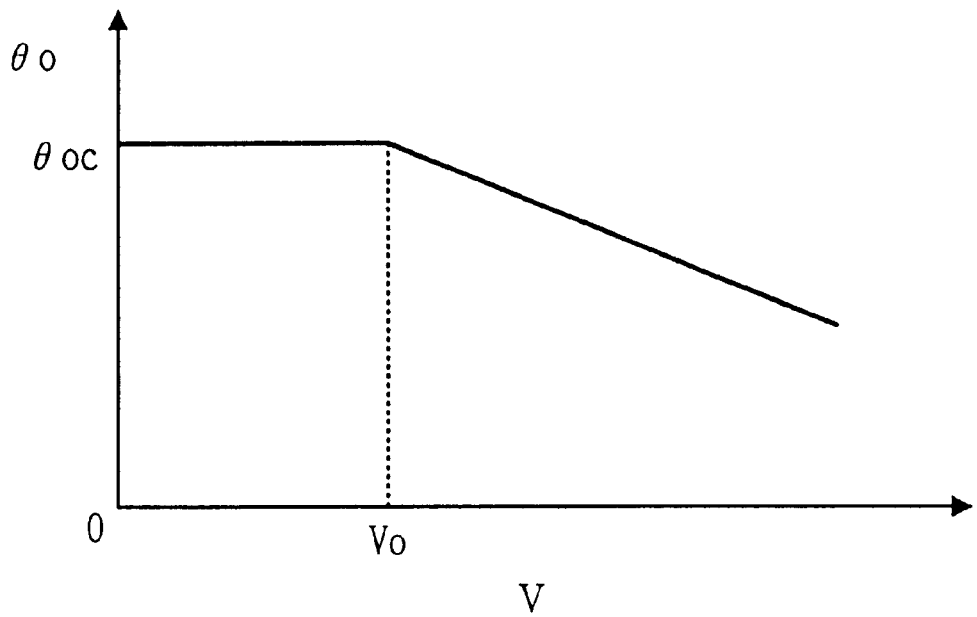
FIG. 3 is a map showing the relationship between vehicle speed V and a threshold value $\theta$ o of hitch angle.

In step 10, signals are read in, and in step 20 it is judged if the trailer brake switch TBSW is on or not. If the answer is no, the control returns to step 10, withholding to execute the automatic trailer brake control according to the present invention. When the answer of step 20 is yes, the control proceeds to step 30, and a threshold value $\theta$ o of the hitch angle $\theta$ is calculated based upon the vehicle speed V by referring to a map such as shown in FIG. 3. In the shown embodiment, the threshold value $\theta$ o is so designed as to be a constant value $\theta$ oc when the vehicle speed V is lower than an intermediate value Vo, and to gradually lower when the vehicle speed increases beyond the value Vo.

In step 40, it is judged if the absolute value of the hitch angle $\theta$ is equal to or larger than the threshold value $\theta$ o. If the answer is no, the control proceeds to step 80, whereas if the answer is yes, the control proceeds to step 44.

In step 44, differential $\theta$ d of the hitch angle $\theta$ is calculated, and in step 46 it is judged if the product of $\theta$ dn which is the differential $\theta$ d at the current cycle and $\theta$ dn−1 which is the differential $\theta$ d at a preceding cycle, is zero or negative. When the answer is no, the control proceeds to step 60, whereas if the answer is yes, the control proceeds to step 48, where the absolute value of the current hitch angle $\theta$ n is adopted as a maximum value $\theta$ max of the hitch angle $\theta$.

Figure 4:
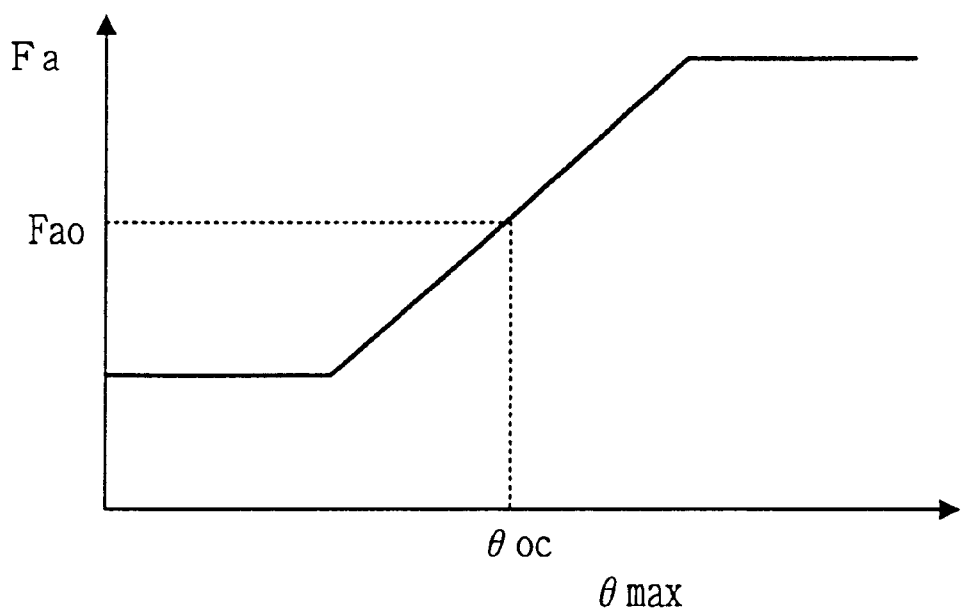
FIG. 4 is a map showing the relationship between a maximum value $\theta$ max of hitch angle and a target value Fa for the brake force.

In step 50, a target value Fa for braking force corresponding to the maximum value $\theta$ max is calculated according to a map such as shown in FIG. 4. Fao is the value of the target brake force Fa which is selected when $\theta$ max according to the above definition is $\theta$ oc.

In step 60, a control signal for actuating the brake means 38L and 38R is dispatched based upon the thus calculated target brake force Fa, while count value T of a timer (not shown) is incremented by a unit time value $\Delta$T.

In step 70, it is judged if the time count T has reached a predetermined threshold value Tc. If the answer is no, the control returns to step 44, whereas if the answer is yes, the control proceeds to step 80, and the trailer braking is stopped, the time count T is reset to 0, and a one time operation of the control routine is finished.

Figure 5:
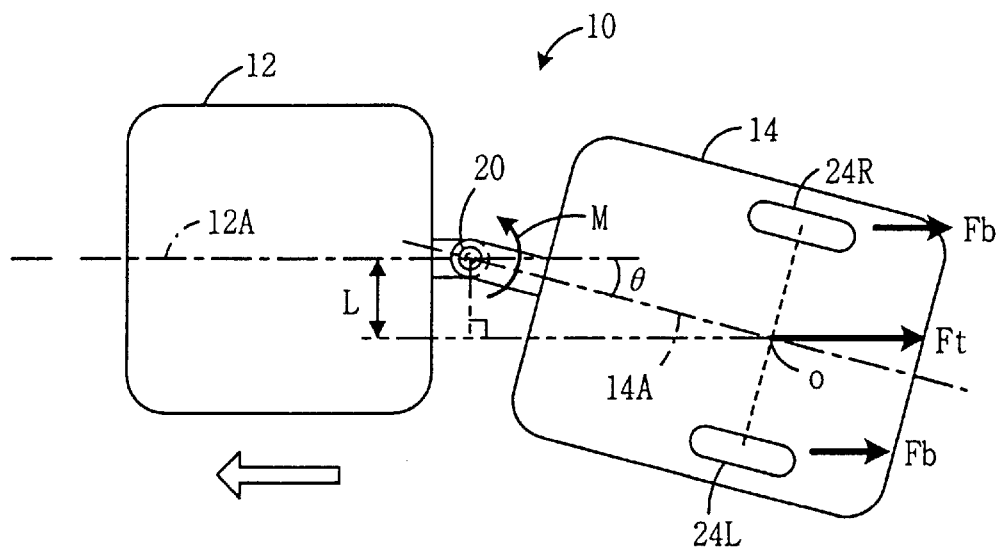
FIG. 5 is a diagrammatical plan view showing how the trailer brake control device according to the present invention operates in the tractor-trailer combination vehicle.

As illustrated in FIG. 5, when the trailer wheels 24L and 24R are braked against the traction from the tractor 12, the brake force Fb generated at each of the trailer wheels generates a combined resistance force Ft (=2×Fb) at a center O between the left and right trailer wheels to act against the tractor in the direction of driving movement thereof, with a lateral deviation L relative to the longitudinal axis 12A of the tractor, so that a turning moment M of an amount of Ft×L is applied to the trailer around the vertical pivot axis of the joint 20.

Figure 6:
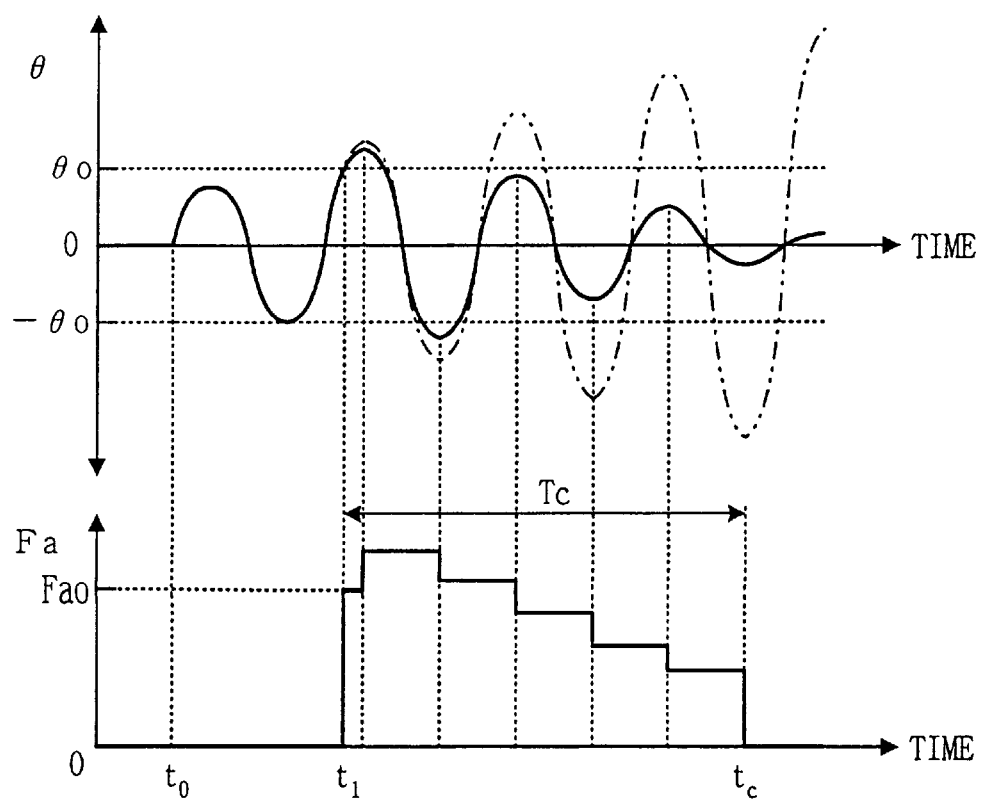
FIG. 6 is a graph showing an example of the oscillatory side sway of the trailer and the actuation of the trailer brake in time accordance.

By such an arrangement, as exemplarily illustrated in FIG. 6, when a substantial side swaying of the trailer starts at time point $t_0$ such that the hitch angle $\theta$ exceeds the threshold value $\theta$ o at time point $t_1$, the trailer brake 36 is actuated, starting at the time point $t_1$ for a time duration Tc until time point tc, so as thereby to apply the turning moment M to the trailer in the direction of suppressing the side swaying of the trailer, wherein the magnitude of the turning moment M is automatically gradually decreased along with subsidence of the side swaying due to a corresponding decrease of the lateral deviation L. In this connection, when the target brake force Fa is determined to be properly increased or decreased according to increase or decrease of the maximum hitch angle $\theta$ max over a medium range thereof as shown in FIG. 4, the magnitude of the anti-swaying moment Fa×L is controlled to be more sensitive about enhancement or subsidence of the side swaying of the trailer. In any event, when the time duration Tc is properly designed in reflection of the magnitude Fa×L of the anti-swaying moment and the side swaying performance of the trailer, the side swaying of the trailer is suppressed to smoothly fade out in a shortest period with the lapse of time duration Tc as shown by a solid curve in FIG. 6, in contrast to an augmentation thereof such as shown by a phantom curve in the figure which would occur when no such side sway suppress control is applied to.

In this connection, when the threshold value $\theta$ o is calculated to be lower as the vehicle speed increases beyond a medium value Vo in step 30 as shown in FIG. 3, the judgment in step 40 turns to yes at an earlier stage of the side swaying according to increase of the vehicle speed, thereby applying the anti-sway moment to the trailer starting at an earlier stage of its side swaying, so that the trailer brake control of the present invention is more effectively operated. Further, when the relationship between Vo and $\theta$ oc is properly determined, it is avoided that the trailer is undesirably braked when the tractor-trailer combination vehicle changes the road lanes at a low or medium vehicle speed.

It will be noted that, although the variable control of the target brake force Fa according to steps 44–50 provides a better performance of the side sway suppress control of the trailer, the target brake force Fa may be determined to be an appropriate constant value all through the time duration Tc, as the anti-swaying moment M=Fa×L is still automatically decreased along with decrease of the side swaying of the trailer, such that a smooth fade out of the side swaying is available by a proper selection of the time duration Tc in relation with the value of Fa.

Further, it will be apparent for those skilled in the art that step 48 may be modified such that θ max is determined to be the absolute value of $\theta_{n-1}$ or the larger of the absolute values of $\theta_n$ and $\theta_{n-1}$.

Figure 2:
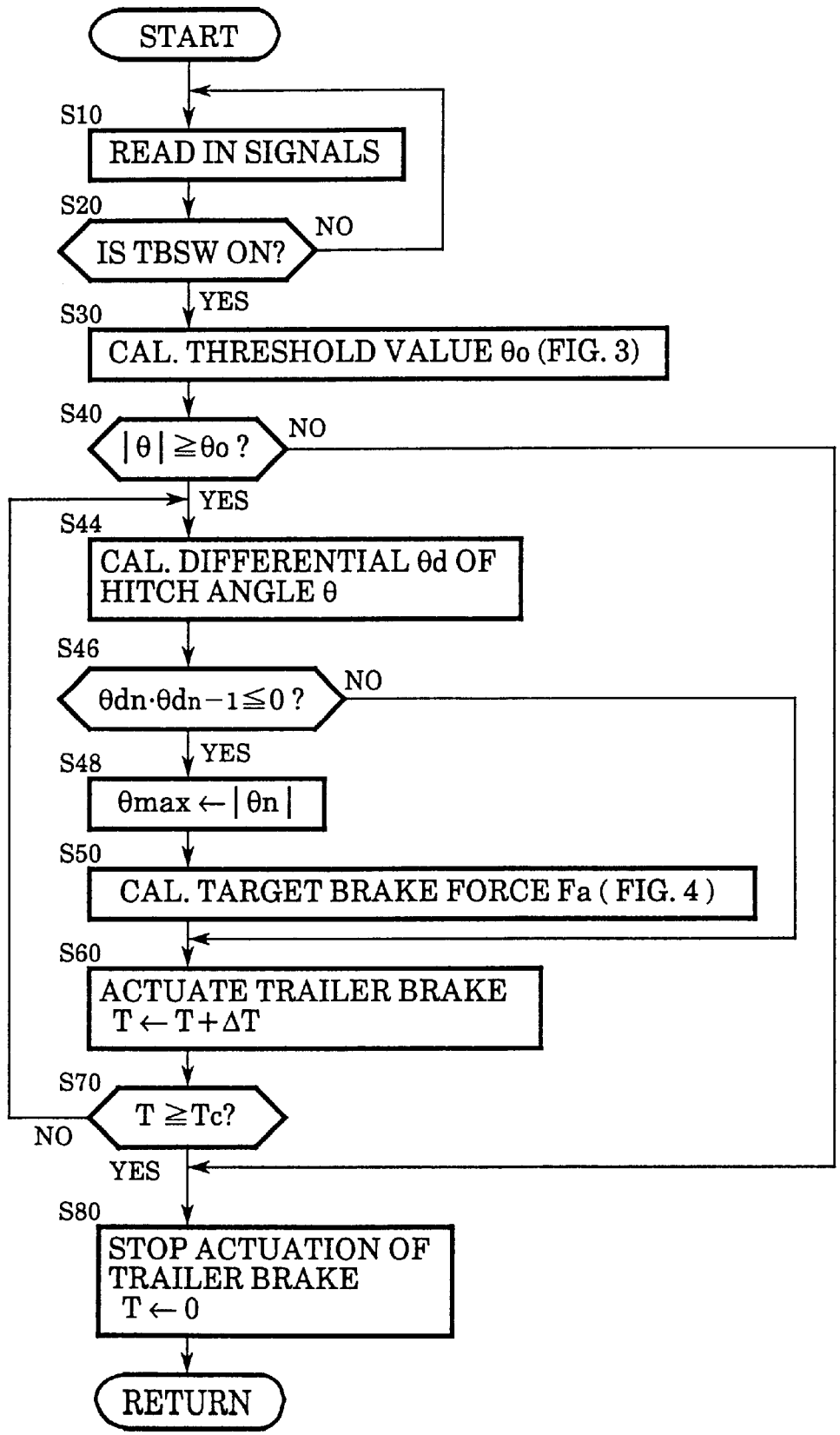
FIG. 2 is a flowchart showing the operation of a first embodiment of the trailer brake control device according to the present invention.
Figure 7:
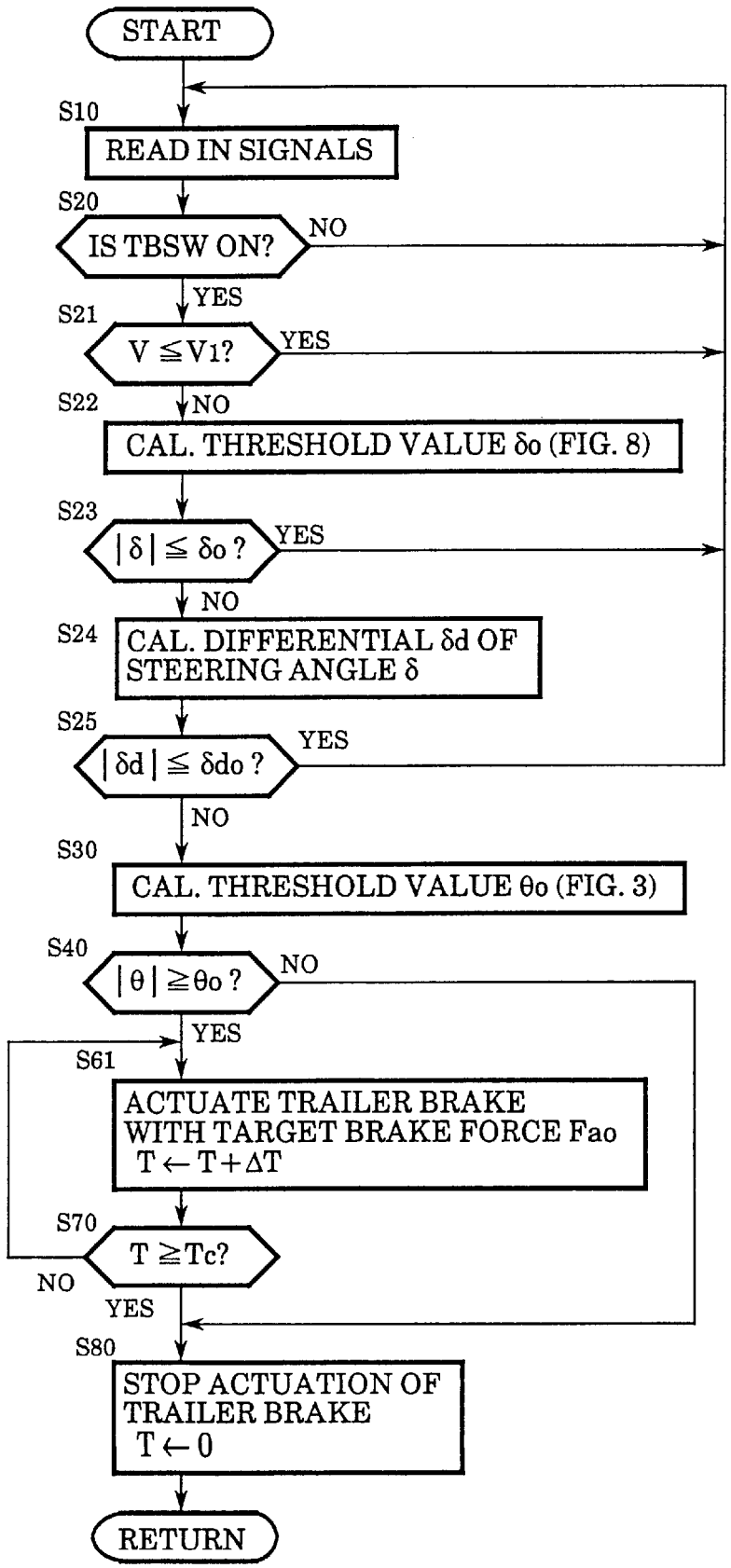
FIG. 7 is a flowchart showing the operation of a second embodiment of the trailer brake control device according to the present invention.

FIG. 7 shows a flowchart similar to that of FIG. 2, showing a second embodiment of the present invention in the form of its operation. In FIG. 7, the steps corresponding to those shown in FIG. 2 are designated by the same step numbers.

In this second embodiment, the trailer brake control device 42 is further supplied with a signal representing steering angle δ of the tractor from the steering angle sensor 50 shown by the phantom indication in FIG. 1B as already described, in addition to those input signals therein shown by the positive indication.

In this second embodiment, the trailer brake is also actuated when the magnitude of hitch angle θ increases beyond the threshold value θ o of the map shown in FIG. 3, so as to suppress the side swaying of the trailer. In this embodiment, however, before executing the side sway suppress control of the trailer, the necessity thereof is checked against the steering behavior of the tractor.

Figure 8:
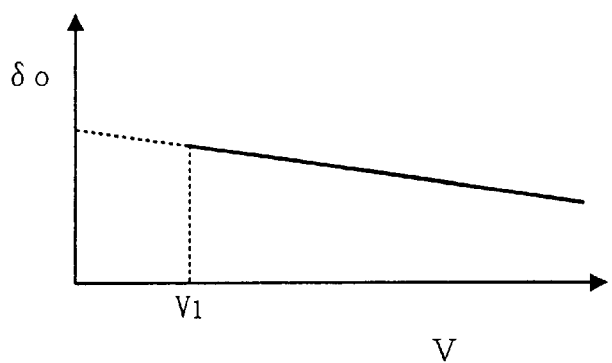
FIG. 8 is a map showing the relationship between vehicle speed V and a threshold value $\delta$ o of steering angle.

So in step 21, it is judged if the vehicle speed V is equal to or smaller than a threshold value $V_1$, and if the answer is no, then in step 22 a threshold value δ o for the steering angle δ is calculated based upon the vehicle speed V according to a map such as shown in FIG. 8. Then in step 23, it is judged if the absolute value of the steering angle δ is equal to or smaller than the threshold value δ o. If the answer is no, in step 24 differential δ d of the steering angle δ is calculated, and in step 25 it is judged if the absolute value of the differential δ d is equal to or smaller than a threshold value δ do determined therefor. If the answer of step 25 is no, the control proceeds to step 30 so that side sway suppress control of the trailer is executed according to increase of the hitch angle. When the answer in any one of steps 21, 23 and 25 is yes, the control is returned to step 10, withholding the execution of the side sway suppress control of the trailer.

Therefore, according to this second embodiment, the side sway suppress control of the trailer is executed on the condition that the vehicle speed V is not smaller than the threshold value $V_1$, the absolute value of the steering angle δ is not smaller than the threshold value δ o, and the absolute value of the differential δ d of the steering angle δ is not smaller than the threshold value δ do. By this arrangement, it is avoided that the brakes of the trailer wheels are uselessly actuated for the purpose of the side sway suppress control when the vehicle speed and/or the steering angle is so small that there would be no need of side sway suppress control by braking the trailer, and further, even when the vehicle speed and the steering angle are large enough to welcome the execution of the side sway suppress control of the trailer, the vehicle is in fact making a stable turn at a substantially constant steering angle.

When the control proceeds to step 30, the threshold value θ o of the hitch angle θ is calculated in the same manner as in step 30 of FIG. 2 based upon the vehicle speed V according to a map such as shown in FIG. 3. Then in step 40, it is judged if the absolute value of the hitch angle θ is equal to or larger than the threshold value θ o. If the answer is yes, in step 61 the trailer brake means 38L and 38R are actuated according to a target brake force such as Fao in FIG. 4 corresponding to the target brake force for the θ max in the first embodiment being θ oc, for the sake of convenience. Of course, the target brake force for step 61 may be determined in other appropriate ways, including the way described with reference to steps 44–50 of FIG. 2. Then steps 70 and 80 are executed in the same manner as in the first embodiment described with reference to FIG. 2.

Figure 9:
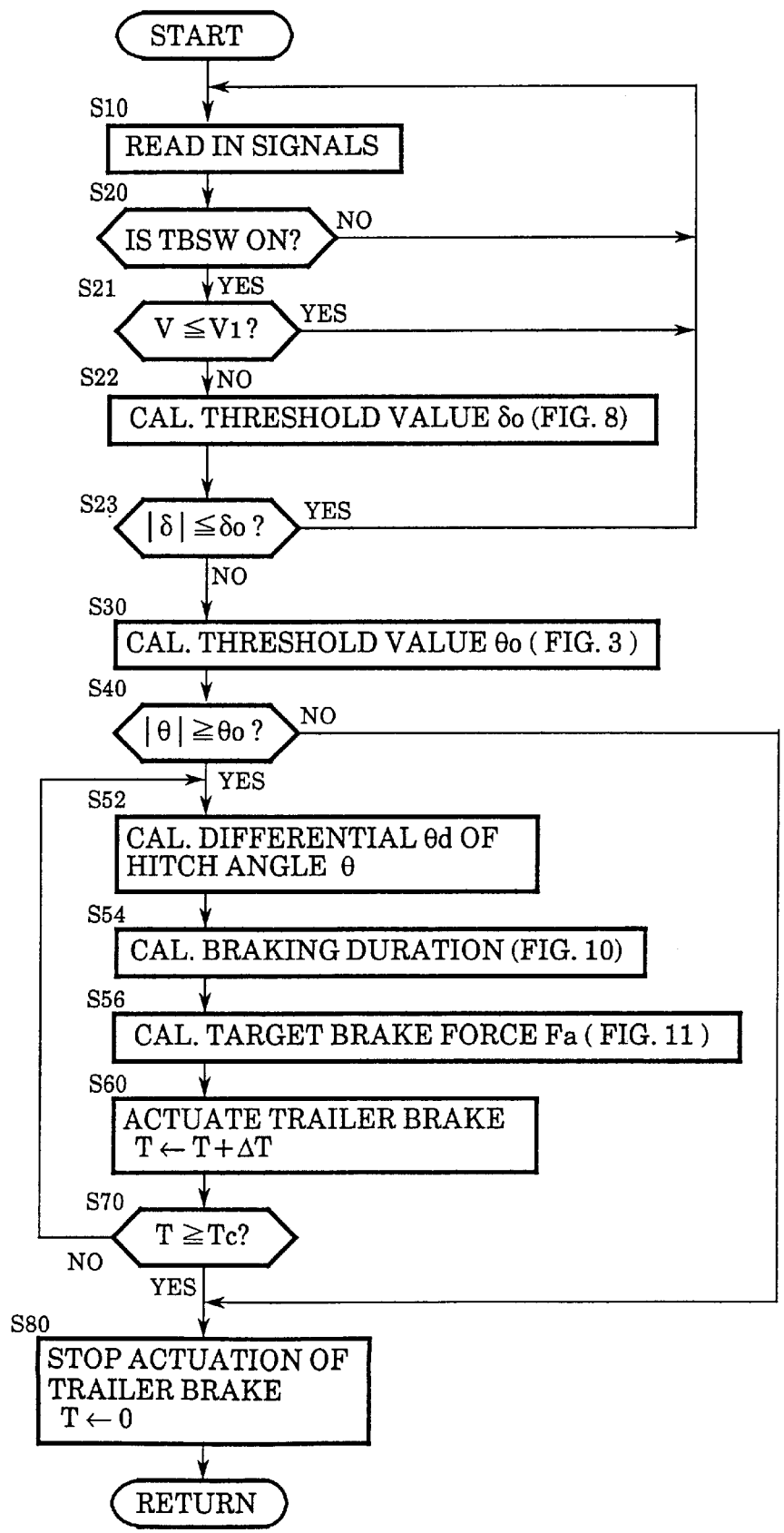
FIG. 9 is a flowchart showing the operation of a third embodiment of the trailer brake control device according to the present invention.

FIG. 9 shows a flowchart similar to that of FIG. 2 or 7, showing a third embodiment of the present invention in the form of its operation. In FIG. 9, the steps corresponding to those shown in FIG. 2 or 7 are designated by the same step numbers.

Figure 10:
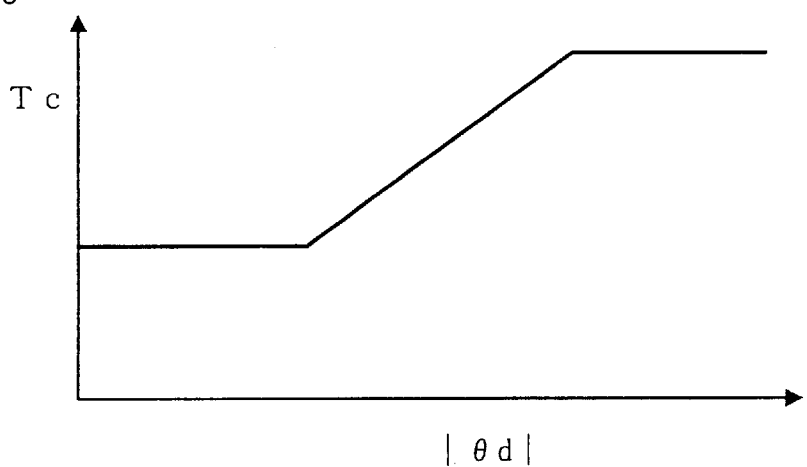
FIG. 10 is a map showing the relationship between the absolute value of differential value $\theta$ d of the hitch angle and the braking duration Tc.
Figure 11:
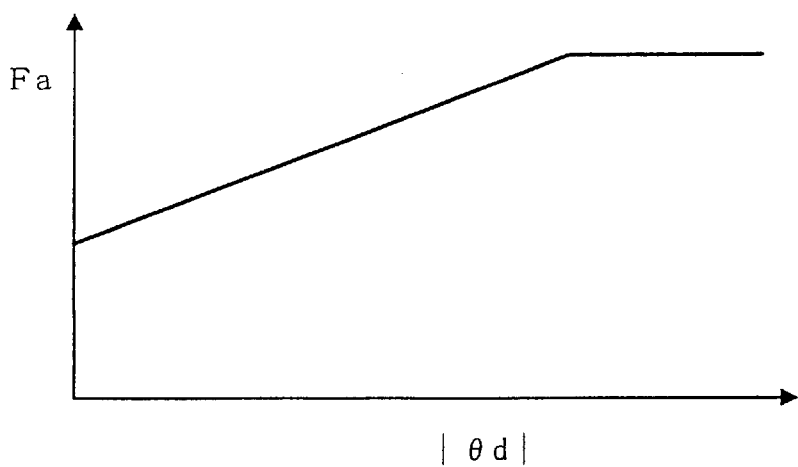
FIG. 11 is a map showing the relationship between the absolute value of differential value $\theta$ d of the hitch angle and the target value Fa for the brake force.

In this third embodiment, steps 10–40 are executed in the same manner as in the second embodiment shown in FIG. 7, except that steps 24 and 25 are omitted. Then, if the answer of step 40 is yes, in step 52 differential θ d of the hitch angle θ is calculated, and then in step 54 the braking duration Tc is calculated based upon the absolute value of the differential θ d by referring to a map such as shown in FIG. 10. In step 56, the target brake force Fa is calculated also based upon the absolute value of the differential θ d by referring to a map such as shown in FIG. 11. Then in steps 60 and 70, the brake means 38L and 38R are actuated according to the target brake force Fa and the braking duration Tc in the same manner as in steps 60 and 70 in FIG. 2, with, however, a cyclic review of the target brake Fa force and the braking duration Tc.

Therefore, according to this third embodiment, since the braking duration Tc and the target brake force Fa are both varied according to the absolute value of the differential θ d of the hitch angle θ, so as to be increased or decreased according to increase or decrease of the absolute value of the differential θ d, respectively, the strength of the side sway suppress control applied to the trailer is adjusted to meet with the inertial force of the side sway movement of the trailer, including the influenced of the steering operation of the tractor, while also excluding such a driving condition of the tractor-trailer combination vehicle that it is making a stable turn at a relatively high speed and a relatively large constant steering angle from the case of applying the side sway suppress control of the trailer which brakes the trailer wheels.

Figure 12:
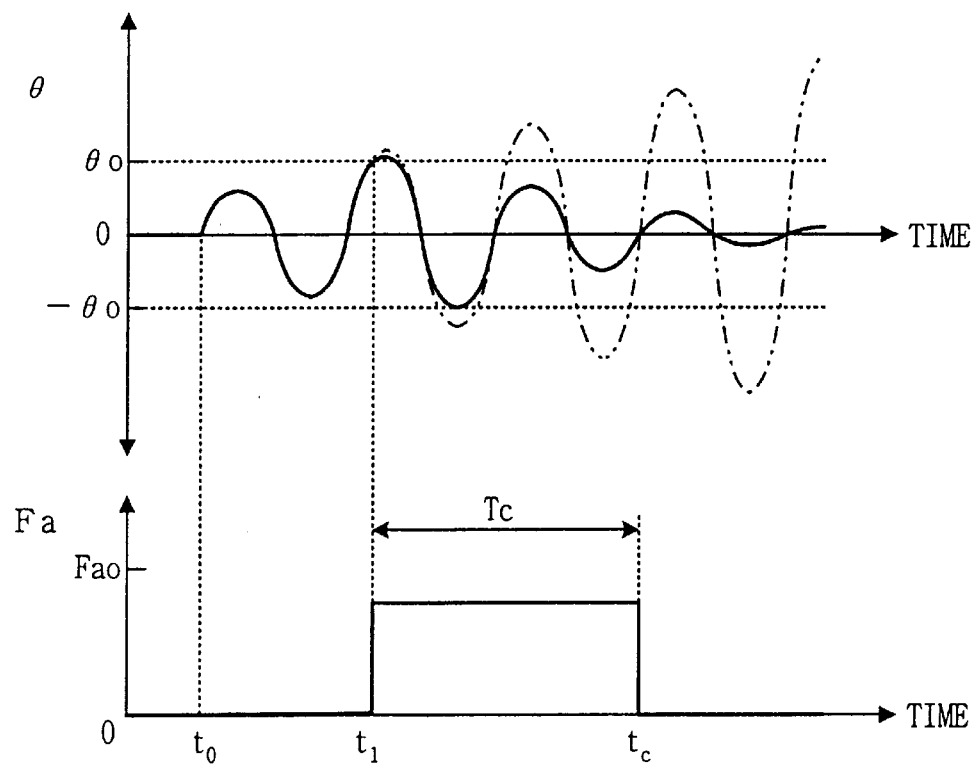
FIG. 12 is a graph showing a relatively moderate oscillation of the trailer side sway and the duration of trailer brake actuation in time accordance.
Figure 13:
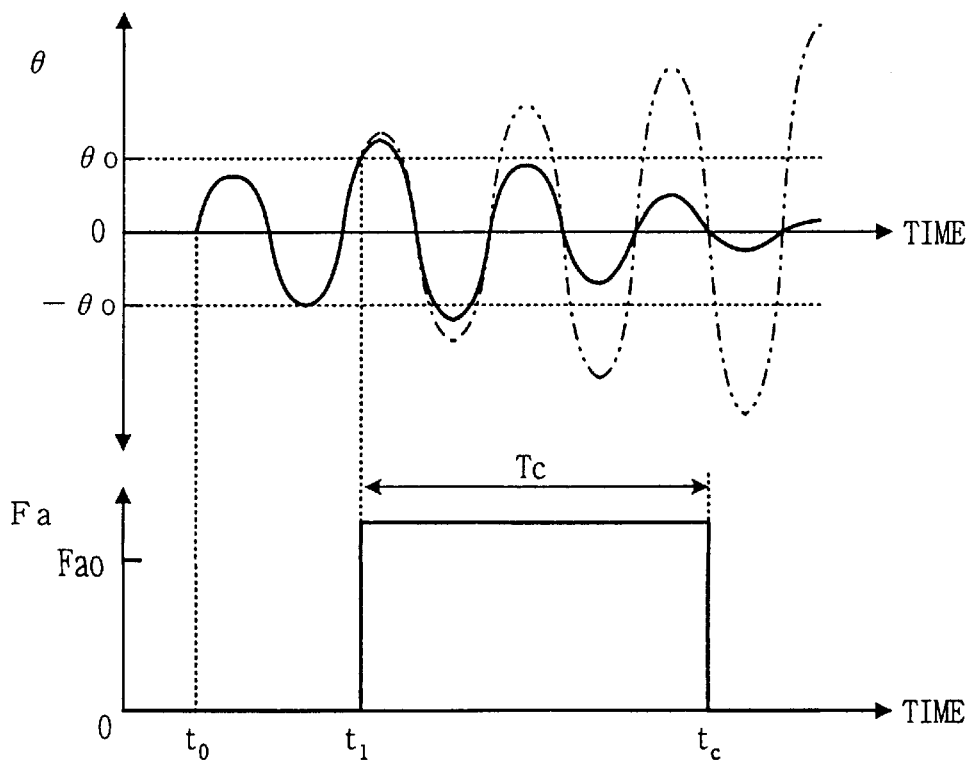
FIG. 13 is a graph showing a relatively strong oscillation of the trailer side sway and the duration of trailer brake actuation in time accordance.

FIGS. 12 and 13 show two examples of the operation of the third embodiment in contrast, wherein when the quickness of the side sway of the trailer is relatively moderate, the braking of the trailer wheels is executed at a relatively low target brake force Fa for a relatively short duration Tc as shown in FIG. 12, while when the quickness of the side sway of the trailer is relatively intense, the braking of the trailer wheels is executed at a relatively high target brake force Fa for a relatively long duration Tc as shown in FIG. 13, so as in either case to accomplish a smooth fade out of the side swaying in a possibly shortest period.

Figure 14:
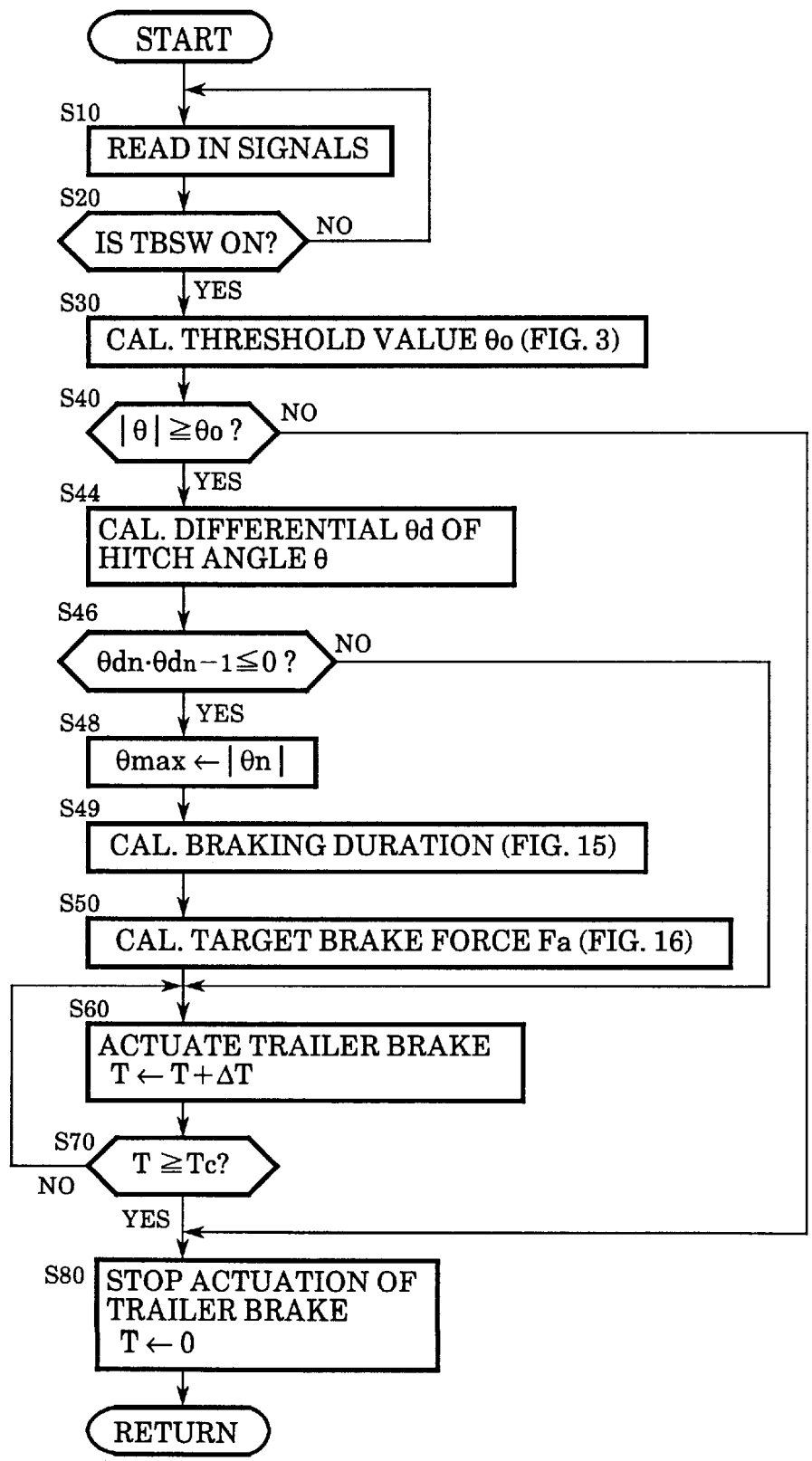
FIG. 14 is a flowchart showing the operation of a fourth embodiment of the trailer brake control device according to the present invention.

FIG. 14 shows a flowchart similar to that of FIG. 2, showing a fourth embodiment of the present invention in the form of its operation, which is a partial modification of the first embodiment shown in FIG. 2. In FIG. 14, the steps corresponding to those shown in FIG. 2 are designated by the same step numbers.

Figure 15:
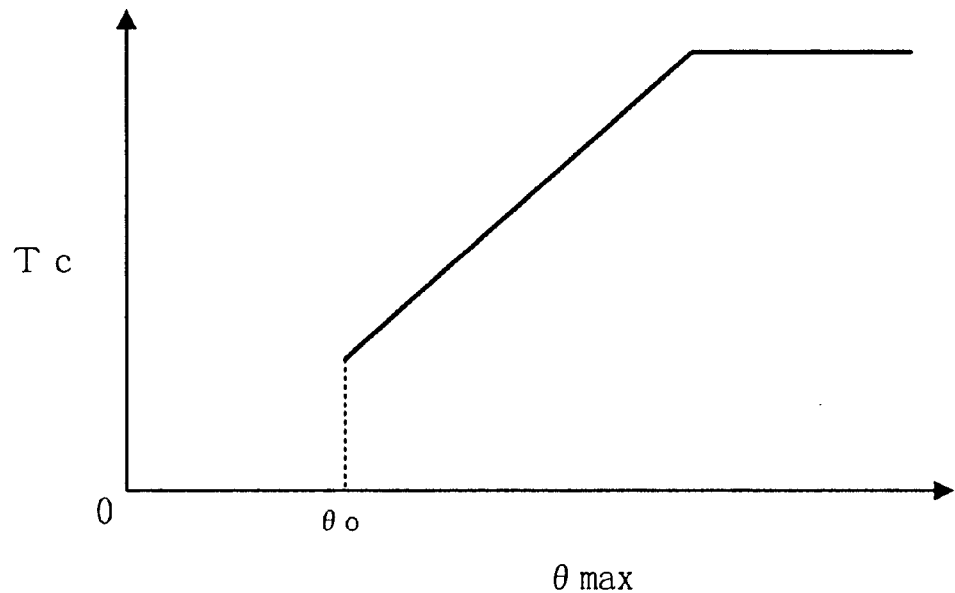
FIG. 15 is a map showing the relationship between a maximum value $\theta$ max of the hitch angle and the braking duration Tc.
Figure 16:
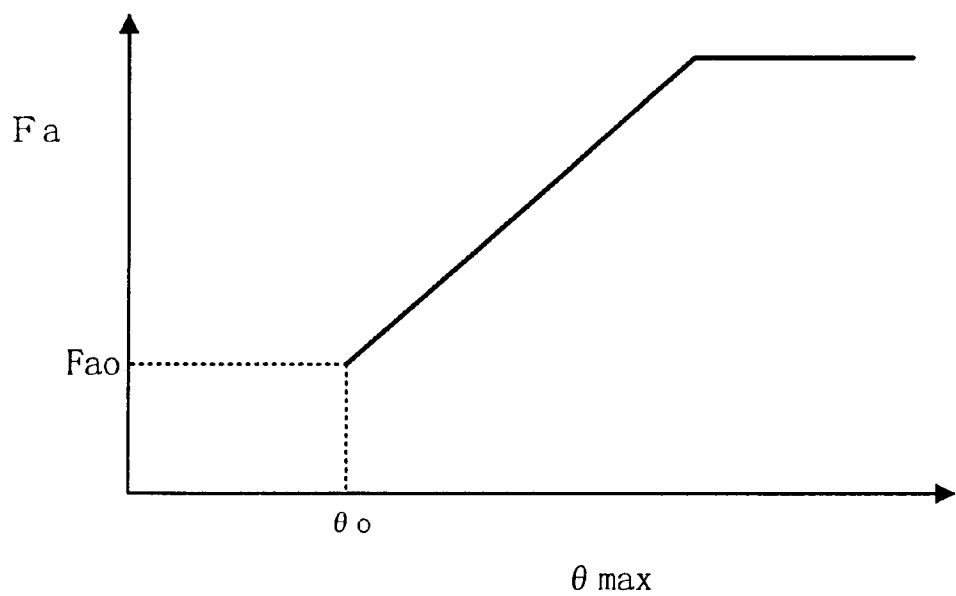
FIG. 16 is a map showing the relationship between a maximum value $\theta$ max of the hitch angle and the target value Fa for the brake force.

In this fourth embodiment, steps 10–48 are executed in the same manner as in the first embodiment shown in FIG. 2. Then, subsequent to step 48, in step 49 the braking duration Tc is calculated based upon the maximum hitch angle θ max by referring to a map such as shown in FIG. 15. Further, in step 50 the target brake force Fa is calculated based upon the maximum hitch angle θ max by referring to a map such as shown in FIG. 16, which is similar to FIG. 4. Then in steps 60–80, the control is executed in the same manner as in the first embodiment shown in FIG. 2.

Therefore, in this fourth embodiment, the target brake force Fa and the braking duration Tc are both determined according to the maximum hitch angle θ max as in the third embodiment shown in FIG. 9, so that the anti-side sway moment applied to the trailer is more sensitively controlled according to the product of the two variably controlled values of the target brake force and the braking duration.

Figure 17:
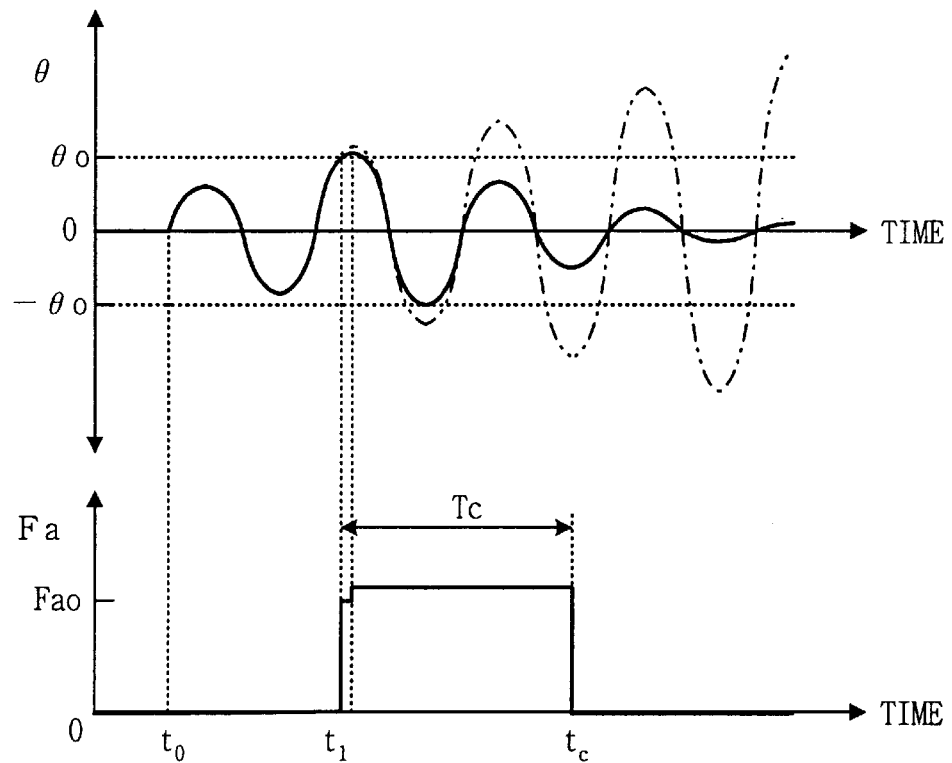
FIG. 17 is a graph showing a relatively moderate oscillation of the trailer side sway and the duration of trailer brake actuation in time accordance.
Figure 18:
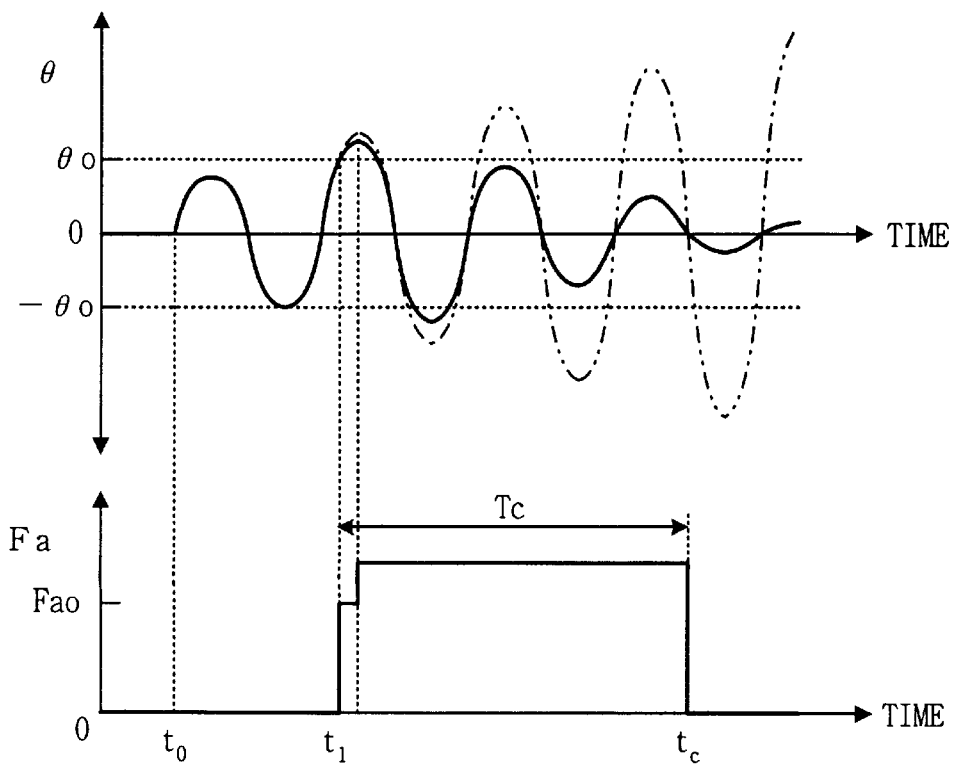
FIG. 18 is a graph showing a relatively strong lateral oscillation of the trailer side sway and the duration of the trailer brake actuation in time accordance.

FIGS. 17 and 18 are graphs similar to FIGS. 12 and 13, showing two examples of the operation of the fourth embodiment in contrast, wherein when the quickness of the side sway of the trailer is relatively moderate, the braking of the trailer wheels is executed at a target brake force Fa changed in a relatively low range for a braking duration Tc changed in a relatively short duration as shown in FIG. 17, while when the quickness of the side sway of the trailer is relatively intense, the braking of the trailer wheels is executed at a target brake force Fa changed in a relatively high range for a braking duration Tc changed in a relatively long duration as shown in FIG. 18, so as in either case to accomplish a smooth fade out of the side swaying in a possibly shortest period.

Although the embodiments have been described in the above based upon the hardware construction shown in FIG. 1A, in which the trailer 14 is selectively braked by the trailer brake control 42 in parallel with the service brake system 28 operated by the driver, it will be apparent that the trailer brake control device according to the present invention may be applied in the same manner to a convenient combination of an ordinary passenger vehicle and a trailer, wherein the trailer is only equipped with the electromagnetic brake means 38L and 38R or the equivalent, with no wheel cylinders 34L and 34R to be connected with the service brake system 28 of the passenger vehicle which operates as a tractor.

Although the present invention has been described in detail with respect to some preferred embodiments thereof, it will be apparent for those skilled in the art that various modifications are possible with respect to the shown embodiments within the scope of the present invention.

We claim:

1. In a tractor-trailer combination vehicle including a tractor, a trailer and a joint having a vertical pivot axis and connecting the trailer with the tractor, the tractor and the trailer each having a longitudinal axis, wheels and brake means for braking the wheels, a trailer brake control device comprising a means for detecting hitch angle expanded by the longitudinal axis of the trailer relative to the longitudinal axis of the tractor around the vertical pivot axis of the joint, and a control means for automatically selectively actuating the brake means of the trailer to apply a braking force, wherein the control means controls the actuation of the trailer brake means based upon at least two operational conditions such that the control means automatically starts the actuation of the trailer brake means when hitch angle increases beyond a threshold value determined therefor and automatically ends the actuation of the trailer brake means when a duration determined for the actuation of the trailer brake means lapses.

2. A trailer brake control device according to claim 1, wherein the control means actuates the trailer brake means with a predetermined constant target value for the strength of braking force generated thereby.

3. A trailer brake control device according to claim 1, wherein the control means actuates the trailer brake means with a variable target value for the strength of braking force generated thereby, by varying the target value based upon a maximum value of the hitch angle in an oscillatory change thereof.

4. A trailer brake control device according to claim 3, wherein the control means generally increases the target value according to increase of the maximum value of the hitch angle in the oscillatory change thereof.

5. A trailer brake control device according to claim 1, further comprising a means for detecting vehicle speed, wherein the control means generally decreases the threshold value of the hitch angle for the actuation of the trailer brake means according to increase of the vehicle speed detected by the vehicle speed detection means.

6. A trailer brake control device according to claim 1, further comprising a means for detecting vehicle speed, wherein the control means controls the trailer brake means to be actuated only when the vehicle speed detected by the vehicle speed detection means is not smaller than a threshold value determined therefor.

7. A trailer brake control device according to claim 1, further comprising a means for detecting steering angle of the tractor, wherein the control means controls the trailer brake means to be actuated only when the steering angle detected by the steering angle detection means is not smaller than a threshold value determined therefor.

8. A trailer brake control device according to claim 7, further comprising a means for detecting vehicle speed, wherein the control means generally decreases the threshold value of the steering angle for the actuation of the trailer brake means according to increase of the vehicle speed detected by the vehicle speed detection means.

9. A trailer brake control device according to claim 1, further comprising a means for detecting steering angle of the tractor, wherein the control means comprises a means for calculating differential of the steering angle detected by the steering angle detection means, and controls the trailer brake means to be actuated only when the differential of the steering angle calculated by the differential calculation means is not smaller than a threshold value determined therefor.

10. A trailer brake control device according to claim 1, wherein the control means comprises a means for calculating differential of the hitch angle detected by the hitch angle detection means, and controls the trailer brake means with a variable target value for the duration of actuation of the trailer brake means, by varying the target value based upon the absolute value of the differential of the hitch angle in an oscillatory change thereof.

11. A trailer brake control device according to claim 10, wherein the control means generally increases the target value for the duration of actuation of the trailer brake means according to increase of the absolute value of the differential of the hitch angle in the oscillatory change thereof.

12. A trailer brake control device according to claim 1, wherein the control means comprises a means for calculating differential of the hitch angle detected by the hitch angle detection means, and actuates the trailer brake means with a variable target value for the strength of braking force generated thereby, by varying the target value based upon the absolute value of the differential of the hitch angle in an oscillatory change thereof.

13. A trailer brake control device according to claim 12, wherein the control means generally increases the target value for the strength of braking force according to increase of the absolute value of the differential of the hitch angle in the oscillatory change thereof.

14. A trailer brake control device according to claim 1, wherein the control means controls the trailer brake means with a variable target value for the duration of actuation of the trailer brake means, by varying the target value based upon a maximum value of the hitch angle in an oscillatory change thereof.

15. A trailer brake control device according to claim 14, wherein the control means generally increases the target value for the duration of actuation of the trailer brake means according to increase of the maximum value of the hitch angle in the oscillatory change thereof.

* * * * *